Jan. 2, 1934.  A. DUBONNET  1,941,879

SUSPENSION

Filed Dec. 15, 1930

André Dubonnet
Inventor
by Louis Barnett
Attorney

Patented Jan. 2, 1934                                            1,941,879

UNITED STATES PATENT OFFICE 1,941,879

SUSPENSION

André Dubonnet, Neuilly-Sur-Seine, France

Application December 15, 1930, Serial No.
502,375, and in Belgium January 16, 1930

8 Claims. (Cl. 267—34)

The present invention relates to suspensions for vehicle wheels of the type described in applicant's copending application Serial Number 415,510, filed Dec. 20, 1929.

One of the objects of the present invention is to provide a form of suspension in which the flexible resistance to shock varies with the load.

Another object is to provide a special form of suspension in which a widely variable yieldable resistance opposes displacements due to shock with small loads and a less variable yieldable resistance comes into play to oppose the action of shocks when the vehicle is heavily loaded.

Further objects will appear in the course of the detailed description now to be given with reference to the accompanying drawing, in which.

Figure 1:
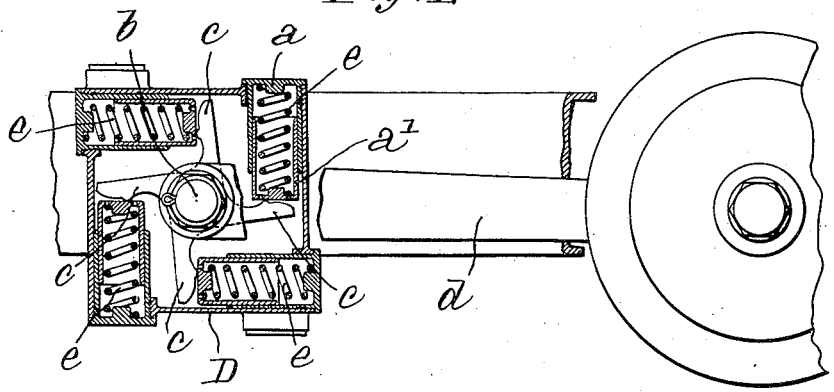
Fig. 1 is a side elevation, partially in section, of one illustrative embodiment of the invention.
Figure 2:
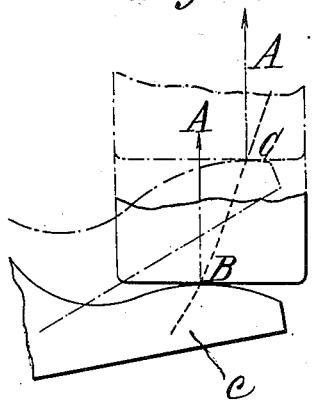
Fig. 2 shows, diagrammatically, a form of structure adapted for use on vehicles designed to be heavily loaded.

Referring to Figs. 1 and 2 of the drawing, there is shown a suspension adapted to be applied independently to each wheel of a vehicle and composed of the following elements: a casing D adapted to contain oil and the various operating elements of the suspension: a plurality of cylindrical elements $a$ (preferably 4 positioned at right angles to one another); pistons $a^1$ slidably mounted in cylinders $a$, each of said pistons being provided with orifices at one end adapted to permit the flow of oil into and out of assemblies $a$, $a^1$; a plurality of springs $e$ tending to force $a$, $a^1$ apart; a plurality of arms $c$ profiled in a manner to be described further on and bearing against pistons $a^1$; a shaft $b$ journalled in casing D and keyed or otherwise rigidly connected to arm $c$; and an arm $d$ positioned outside of casing D and connected at upward extremities to shaft $b$ and to a wheel to be suspended.

Figure 3:
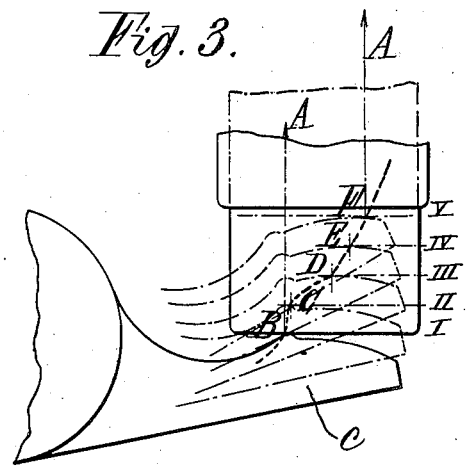
Fig. 3 represents, daigrammatically, a compositely profiled form of device designed to act differently under light and heavy loading conditions.

Arm $c$ may be profiled as shown in either Figs. 2 or 3. In the form of profile shown in Fig. 2 and designed for heavy loads, the point of application of the resultant A, shifts outwardly along the trajectory of dotted line B C. In other words, as shaft $b$ rotates, the magnitude of the resisting couple due to the movement of pistons $a^1$ increases because of the outward shift of the point of application of the resultant resisting force.

In the form of device shown in Figs. 1 and 3, the profile of arm $c$ is made composite so as to present a first portion near the axis of rotation of shaft $b$ and of relatively short radius, and a second portion of similar profile to the form of arm represented in Fig. 2. It will be readily seen that for small loads, the point of application of arm $c$ to the end of pistons $a^1$ will suffer but little lateral displacement; on the contrary, as soon as the vehicle is heavily loaded, that portion of arm $c$ profiled as in Fig. 2, i. e. of relatively long radius, comes into action and has the same characters, as to resistance, as the form of arm shown in the latter figure.

Figure 4:
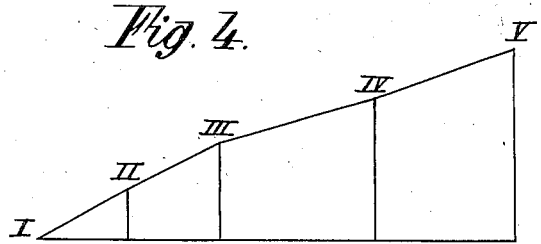
Fig. 4 is a diagram showing the flexibility of suspensions of the type illustrated in Figs. 1 and 3.

Fig. 4 shows, diagrammatically, the relation between the flexibility of the suspension and the loads applied, the loads being indicated as abscissæ and the displacements of the chassis (the flexibility being represented by the inclination of the tangent to the curve obtained relatively to the abscissæ) as ordinates.

From the foregoing, it will be seen that, for small loads, flexibility is relatively great, whereas for heavy load, flexibility progressively diminishes.

The invention is, obviously, not limited to structures in which arms $c$ have a composite profile limited to only two portions of differing curvature. Any number of surfaces of desired profile may be formed seriatum along arms $c$ so as to vary the flexibility relatively to any variable load.

What I claim is:—

1. In a vehicle suspension, a chassis, an arm pivotally supported on said chassis, a wheel suspended from said arm, a second arm mounted to rotate with said first named arm, said second arm being formed to present a pair of curved surfaces of different curvature together forming a broken composite surface, and resilient means positioned to successively bear tangentially against said pair of surfaces during variations in load on said chassis.

2. In a vehicle suspension, a chassis, a first arm pivotally supported on said chassis, a wheel suspended from said first arm, a second arm mounted to rotate with said first arm, said second arm being formed to present a pair of surfaces of different curvature together forming a broken composite surface, the surface of lesser curvature being nearer the axis of rotation of said first arm, and resilient means positioned to bear against one of said pair of surfaces.

3. In a vehicle suspension, a chassis, a first arm pivotally supported on said chassis, a wheel carried by said arm, a second arm mounted to rotate with said first arm, said second arm being formed to present a pair of intersecting surfaces of different curvature, the surface of lesser curvature being nearer the axis of rotation of said first arm, and resilient means conditioned to bear successively against said pair of surfaces during variations in load on said chassis.

4. In a vehicle suspension, a chassis, an arm pivotally supported on said chassis, a wheel suspended from said arm, a second arm mounted to rotate with said first named arm, said second arm being formed to present a pair of convexly curved surfaces of different curvature together forming a broken composite surface, and resilient means positioned to successively bear tangentially against said pair of surfaces during variations in load on said chassis.

5. In a vehicle suspension, a chassis, a first arm pivotally supported on said chassis, a wheel suspended from said first arm, a second arm mounted to rotate with said first arm, said second arm being formed to present a pair of convexly curved surfaces of different curvature together forming a broken composite surface, the surface of lesser curvature being nearer the axis of rotation of said first arm, and resilient means positioned to successively bear against said pair of surfaces.

6. In a vehicle suspension, a chassis, a first arm pivotally supported on said chassis, a second arm mounted to rotate with said first arm, said second arm being formed to present a pair of convex intersecting surfaces of different curvature, the surface of lesser curvature being nearer the axis of rotation of said first arm, and resilient means positioned to bear successively against said pair of surfaces during variations in load on said chassis.

7. In a vehicle suspension wheel, a chassis, a wheel supporting element oscillatably supported about an axis on said chassis and carrying said wheel for rotation about another axis, a plurality of arms mounted to rotate with the first mentioned arm, a fluid-containing casing in which the second mentioned arms are mounted, dash pot elements one for each of said second mentioned arms and bearing thereagainst, and springs in said dash pot elements, the surface of each of said second mentioned arms cooperating with the respective dash pot being so constructed and arranged as to increase the leverage exerted by the associated spring with increase of load on the chassis.

8. In a vehicle suspension, a wheel, a chassis, a wheel supporting arm oscillatably supported about an axis on said chassis and carrying said wheel for rotation about another axis, a second arm mounted to rotate with the first mentioned arm, a spring reacting upon said second arm for resiliently supporting said chassis, an element interposed between said spring and said second arm, said second arm being formed to present a pair of surfaces of different curvature successively to said element, the surface of lesser curvature being nearer the axis of rotation of said first arm, the parts being so constructed and arranged that said surface of lesser curvature is in engagement with said element when the first mentioned arm is substantially horizontal.

ANDRÉ DUBONNET.